United States Patent Office 3,679,360
Patented July 25, 1972

3,679,360
PROCESS FOR THE PREPARATION OF BRUSHITE CRYSTALS
Bernard Rubin, Belmont, and James D. Childress, Arlington, Mass., assignors to the United States of America as represented by the Administrator of the National Aeronautics and Space Administration
No Drawing. Filed June 26, 1970, Ser. No. 50,339
Int. Cl. C01b 25/32; A61k 5/02
U.S. Cl. 23—109                           3 Claims

ABSTRACT OF THE DISCLOSURE

A process for the preparation of calcium phosphate salts wherein a calcium phosphate salt is deposited from a gel medium onto the surface of a tooth. The use of the gel diffusion process to deposit the constituents of tooth enamel onto the surface of a weak or damaged tooth and thereby effect repair of the tooth is disclosed.

Origin of the invention

The invention described herein was made by employees of the United States Government and may be manufactured and used by or for the Government for governmental purposes without the payment of any royalties thereon or therefor.

Background of the invention

This invention relates to a method for the formation of calcium phosphate salts, in particular those calcium phosphate materials that are formed in biological mineralization. More particularly, this invention is concerned with the formation of brushite, $CaHPO_4 \cdot 2H_2O$, which is a precursor of hydroxyapatite, the major component of tooth enamel. The invention provides a method of precipitating calcium phosphate crystals from a nutrient gel, and the use of the calcium phosphate deposition process to repair weak or damaged teeth.

A purpose of this invention is to provide a method for the deposition of the constituents of dental enamel to physically weak, damaged or deteriorated teeth. Prior to this invention, dental enamel defects, cavities, caries, etc. were repaired by removing the weak or damaged area, so that repair of that area could be effected by filling with a material such as amalgams or porcelains, for example as shown in U.S. Pats. 3,367,788 and 3,247,593.

The disadvantages of these prior techniques are that a foreign material is used for replacing the damaged area, and these materials must be cemented into the tooth cavity after removal of the damaged portion. Neither silver amalgam nor synthetic procelain is the same as the hydroxyapatite of which the tooth is naturally made.

Biological mineralization as it occurs in higher animals is the result of the precipitation and crystal growth of calcium phosphate salts from a supersaturated serum or gel. In mature bone and teeth, the calcium phosphate occurs generally as hydroxyapatite, $Ca_5(PO_4)_3(OH)$. Although hydroxyapatite is the mineral phase found in mature bones and teeth, it is thought that this is not necessarily the phase that first precipitates during biological mineralization.

Brushite is thought to be the phase that first precipitates and that is subsequently converted to hydroxyapatite. That is brushite is a precursor of the hydroxyapatite and at basic pH values converts to hydroxyapatite, while at neutral or acid pH values brushite transforms into other calcium phosphate salts.

The process of this invention provides a method for the application of brushite/apatite onto the surface of a tooth; the conversion of brushite to hydroxyapatite will occur either during or after deposition, ultimately resulting in the tooth surface being covered by hydroxyapatite. Thus, the advantage of this invention over prior techniques of tooth repair is that natural hydroxyapatite is laid down on the tooth instead of a silver amalgam, porcelain, or other foreign material. Further, the apatite is grown epitaxially on the enamel of the tooth itself, therefore, there is no cement, glue, etc. involved. Repair is made in such a way that it is similar to the natural method of tooth growth.

Brief summary of the invention

The invention provides a method for the preparation of calcium phosphate salts by means such that such material can be used to repair weak or damaged teeth. The method of preparation is similar to the natural process of biological mineralization.

A gel diffusion system is used to prepare crystals of brushite, which material subsequently converts to hydroxyapatite. By the use of the gel diffusion system is described herein, the constituents of tooth enamel may be deposited on the surface of a weak or damaged tooth, covering or replacing the weak or damaged portion and thereby effecting repair.

The gel diffusion system is prepared as follows. A gelatinous substance such as silica gel containing phosphate ions is used as a base material. A solution of a soluble calcium salt, say $Ca(NO_3)_2 \cdot 2H_2O$, is applied on top of the gel. The diffusion of Ca ions into the gel and subsequent reaction with the phosphate ions in the gel gives rise to brushite crystals. Ultimately, the conversion of brushite to hydroxyapatite will occur.

If the gel and calcium salt solution are applied to the damaged surface of a tooth, the brushite crystals are deposited onto the tooth surface and are therein or thereafter converted to hydroxyapatite, thus covering the damaged portion.

Detailed description of the invention

In the practice of the invention, the gelatinous substance is so compounded so as to have a resulting pH and toxicity compatible with the mouth. A possible medium is a sodium silicate gel made from sodium metasilicate and phosphoric acid. Other gels may be used, such as "Carbopol," which is a synthetic hydrophilic colloid manufactured by the B. F. Goodrich Company; gelatin; or other organic materials that polymerize in the presence of acids to a gelatinous medium.

If the calcium phosphate materials are to be formed directly on the tooth in situ, the gel is applied to the tooth surface and a supersaturated solution of a soluble, non-toxic calcium salt is painted on top of the gel.

The following examples serve to illustrate the process of the invention but are in no way limiting thereto.

EXAMPLE I

A gel was prepared as follows: to a solution of 43.2 g. $Na_2SiO_3 \cdot 9H_2O$ in 250 ml. $H_2O$ a mixture of equal volumes of 0.3 M phosphoric acid and 0.1 M hydrofluoric acid was added until the pH was 6.5. 40 ml. of the resulting viscous solution was poured into a 25 x 200 ml. test tube and held at 40° C. for 24 hours. After 24 hours gelation was complete. A nutrient solution of 0.5 M $Ca(NO_3)_2 \cdot 2H_2O$ was carefully floated on the surface of the gel, and after several minutes, a dense white precipitate appeared below the gel-nutrient interface. The test tube was stoppered and set aside at ambient temperature. After 2 months, tiny transparent crystallites were observed at the interface. Some crystallites grew slowly into sheets of various shapes, the largest of which was about 13 mm. on its longest edge. A sample of the crystalline sheet material was removed with a spatula and washed thoroughly with water.

The sample was analyzed with an electron beam microprobe which indicated that the sample was a calcium phosphate containing less than 100 p.p.m. fluorine. X-ray diffractometry indicated that the material was brushite. Back reflection Laue diffractometry verified the single crystallinity of the sample.

EXAMPLE II

A gel was prepared as in Example I and a supersaturated $Ca(NO_3)_2 \cdot 2H_2O$ solution added. After the appearance of the dense white precipitate, the precipitate and the gel were removed from the test tube and shaken vigorously in a stoppered bottle to break up the gel. The resulting mixture was filter dried, and a sample was analyzed by X-ray diffractometry. Comparison of the sample to a fluorapatite standard indicated that the dense white precipitate was fluorapatite, $Ca_5(PO_4)_3F$. This example demonstrates the co-existence of brushite and apatite crystals, just as in the formation of calculus, the calcified material that accumulates on the teeth and is the etiological agent in periodontal disease.

Since the purpose of this invention is to provide means by which dental repair or maintenance can be effected, how such repairs might be made in practice is described in the following illustrations.

ILLUSTRATION I

It is conceived that a carie could be repaired by (1) treating the tooth decay and removing the decay products from the cavity by chemical and/or mechanical means with minimum cutting and removing of existing dental enamel, (2) filling the resultant cavity by a suitable and convenient material as required (3) preparing (say, as by roughening) the dental surfaces on which apatite growth is desired, (4) applying on said surfaces a coating of a nutrient gel as previously described, (5) placing over this coating a layer of suitable absorbent material containing the aforementioned calcium salt solution, (6) covering the tooth and coatings thereon with a suitable temporary cap, and (7) after several days removing the cap and polishing the tooth surface by usual means as required. Steps (3) through (7) may be repeated as many times as necessary to achieve the tooth surface desired.

ILLUSTRATION II

It is conceived that thin, weak dental enamel can be strengthened by the growth of apatite onto the existing material by steps (3) through (7) of Illustration I and repetition thereof until the desired effect is obtained.

While there have been shown and described particular embodiments of the gel diffusion system of the invention, it will be obvious to those skilled in the art that various changes and modifications may be made therein without departing from the invention, and, therefore, it is aimed to cover all such changes and modifications as fall within the true spirit and scope of the invention.

What is claimed is:
1. A process for preparation of brushite crystals which comprises:
   (a) forming a calcium-free silica gel containing phosphate ions and having a pH of about 6.5;
   (b) disposing said gel in a layer with an exposed surface;
   (c) applying to said surface an aqueous solution containing calcium ions; and
   (d) maintaining said solution in contact with said gel surface until said calcium ions diffuse into said gel and brushite crystals are formed.
2. The process as defined in claim 1 wherein said gel is formed by reacting sodium metasilicate with phosphoric acid.
3. The process as defined in claim 2 wherein the pH of said gel is adjusted to a value of 6.5 by addition of a hydrofluoric acid solution thereto.

References Cited
UNITED STATES PATENTS

| | | | |
|---|---|---|---|
| 2,605,229 | 7/1952 | Marcus | 23—109 X |
| 3,027,229 | 3/1962 | Towney et al. | 23—109 |
| 3,427,125 | 2/1969 | Hayakawa et al. | 23—109 |
| 1,794,510 | 3/1931 | Bischoff | 424—128 |

OSCAR R. VERTIZ, Primary Examiner

C. B. RODMAN, Assistant Examiner

U.S. Cl. X.R.

23—108; 32—15; 424—128